United States Patent [19]

Kozuki et al.

[11] 4,176,936

[45] Dec. 4, 1979

[54] MOTOR DRIVE UNIT FOR A CAMERA

[75] Inventors: Susumu Kozuki; Masanori Uchidoi, both of Yokohama; Nobuaki Date, Kawasaki; Masami Shimizu, Tokyo; Hiroshi Aizawa, Kawasaki; Yoshiyuki Takishima, Yokohama, all of Japan

[73] Assignee: Canon Kabushiki Kaisha, Tokyo, Japan

[21] Appl. No.: 861,905

[22] Filed: Dec. 19, 1977

[30] Foreign Application Priority Data

Dec. 24, 1976 [JP] Japan .................................. 51/155995

[51] Int. Cl.$^2$ .......................... G03B 7/10; G03B 1/18
[52] U.S. Cl. ...................................... 354/38; 354/50; 354/173
[58] Field of Search .................... 354/38, 43, 44, 50, 354/51, 60 R, 60 L, 173, 266, 289, 295, 36; 352/141

[56] References Cited

U.S. PATENT DOCUMENTS

| 3,695,158 | 10/1972 | Fahlenberg | 354/36 |
| 3,973,268 | 8/1976 | Arai | 354/173 |
| 4,054,888 | 10/1977 | Kozuki | 354/50 |
| 4,079,392 | 3/1978 | Orban | 354/60 R X |

Primary Examiner—L. T. Hix
Assistant Examiner—William B. Perkey
Attorney, Agent, or Firm—Toren, McGeady and Stanger

[57] ABSTRACT

A motor drive unit adapted for use with a camera having a motorized shutter speed adjusting device. When a continuous series of frame exposures are to be made at a predetermined frame frequency, the set value of shutter time in the camera is made to be compared with the longest possible shutter time dependent upon that frame frequency by a comparator provided in the motor drive unit. When the actual shutter time value exceeds the longest possible one, the motorized shutter speed adjusting device is actuated, causing the shutter time value to change itself to the longest possible value.

17 Claims, 9 Drawing Figures

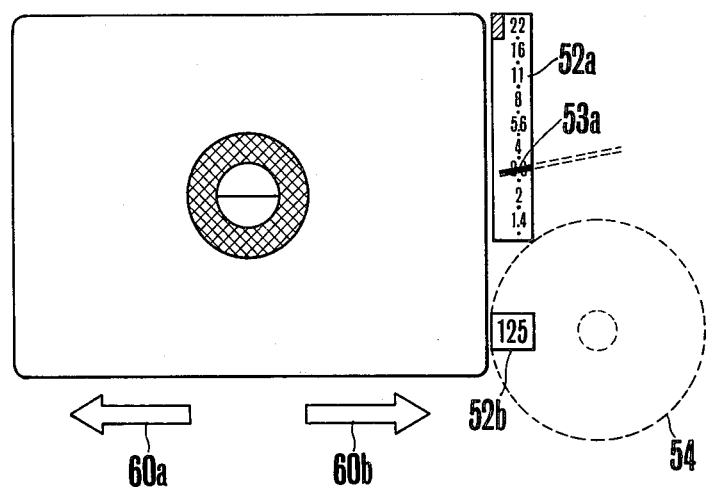
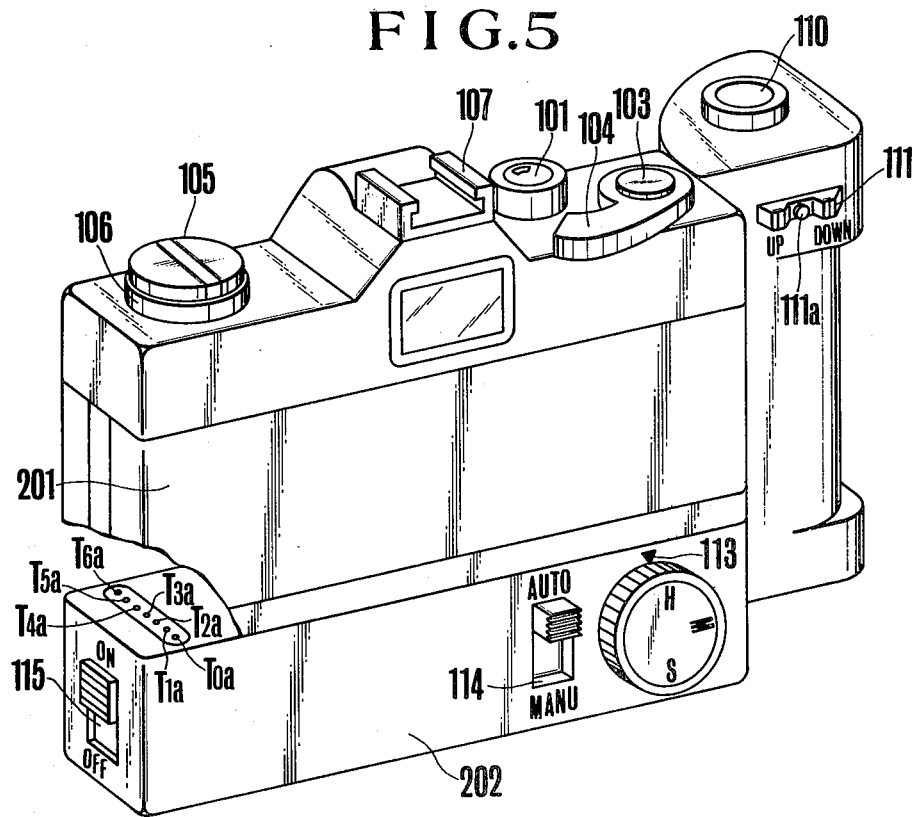

MOTOR DRIVE UNIT FOR A CAMERA

BACKGROUND OF THE INVENTION

1. Field of the Invention

This invention relates to a motor drive unit for a camera which enables the shutter speed of the camera to be adjustable in accordance with the frame frequency.

2. Description of the Prior Art

In the recently advanced model of single lens reflex cameras, a wide variety of automatic exposure control apparatus of the so-called TTL light metering type have found their use in combination with an electric motor drive unit so that it is enabled to make not only a single frame exposure but also a multiframe exposure or a continuous series of frame exposures, as the cycle of shutter releasing and film winding operation is controlled by the motor drive unit.

Such motor driven cameras may be classified into two main groups, one of which is associated with the shutter priority AE camera, and the other of which is associated with the diaphragm priority AE camera. For the shutter priority AE camera with the associated motor drive, because of the previous setting of an exposure time, a continuous sequence of frame exposure can be made at a constant frame frequency. For the diaphragm priority AE camera with the associated motor drive, because of the occurrence of change in the exposure time each time when an exposure is made as the intensity of light changes, the frame frequency for the continuous sequence can not be maintained constant.

On this account, when the photographer desires to make a certain number of exposures per second in sequence with the conventional motor driven camera, he or she need to manipulate that camera prior to the making of exposures as follows. When the continuous sequence is performed with preselection of a desired frame frequency, as the shutter priority camera is used to permit preselection of a desired shutter speed in accordance with which the diaphragm valve is automatically determined, it is possible to obtain the necessary frame frequency provided that the set value of shutter time is equal to or smaller than the longest possible one corresponding to that frame frequency. However, when this requirement is violated by mistake or by the incapability of the photographer who is a beginner in estimating that longest possible shutter time relative to the desired frame frequency, he or she will fail in achieving performance of the continuous sequence as contradicted to his or her desire. With the diaphragm priority camera, on the other hand, as a desired diaphragm value is previously selected to automatically determine the shutter time as a function of scene brightness, the so-determined value of shutter time is required to be equal to or smaller than the longest possible one dependent upon the selected frame frequency, or otherwise it is impossible to perform a continuous sequence at a constant frame frequency. In consequence, the photographer must know how large shutter time value the exposure meter takes at, and then judge whether or not this value is below the longest possible one. If not so, the diaphragm adjusting means or ring must be operated again. Such repeated settings of the diaphragm ring is troublesome. Further, as the number of frame frequencies available in the motor drive control is increased, the complexity of manipulation of the motor driven camera is increased with increase in the possibility of effecting faulty operation, as the photographer is required to memorize the longest possible shutter time values, or to estimate a necessary one by computation each time he or she has foregotten it.

An object of the present invention is to overcome the above mentioned drawbacks and to provide an electric motor drive unit for a camera in which the set or adjusted value of shutter time in the camera is compared with the longest possible shutter time value dependent upon the selected frame frequency to monitor the shutter time setting or adjustment.

Another object is to provide an electric motor drive unit for a camera in which it is made possible to selectively control the motor drive for photography at a certain constant frame frequency and shutter speed responsive frame frequencies.

These and other objects of the invention will become apparent from the following detailed description of preferred embodiments thereof taken in conjunction with the accompanying drawings in which:

BRIEF DESCRIPTION OF THE DRAWINGS

FIG. 3 is a plan view of the field of view of a camera finder of FIG. 2.

FIG. 5 is a perspective view of a motor drive unit of the invention associated with the camera of FIG. 1 with a portion broken away to illustrate an arrangement of electrical interconnection terminals.

DESCRIPTION OF THE PREFERRED EMBODIMENTS

Figure 1:
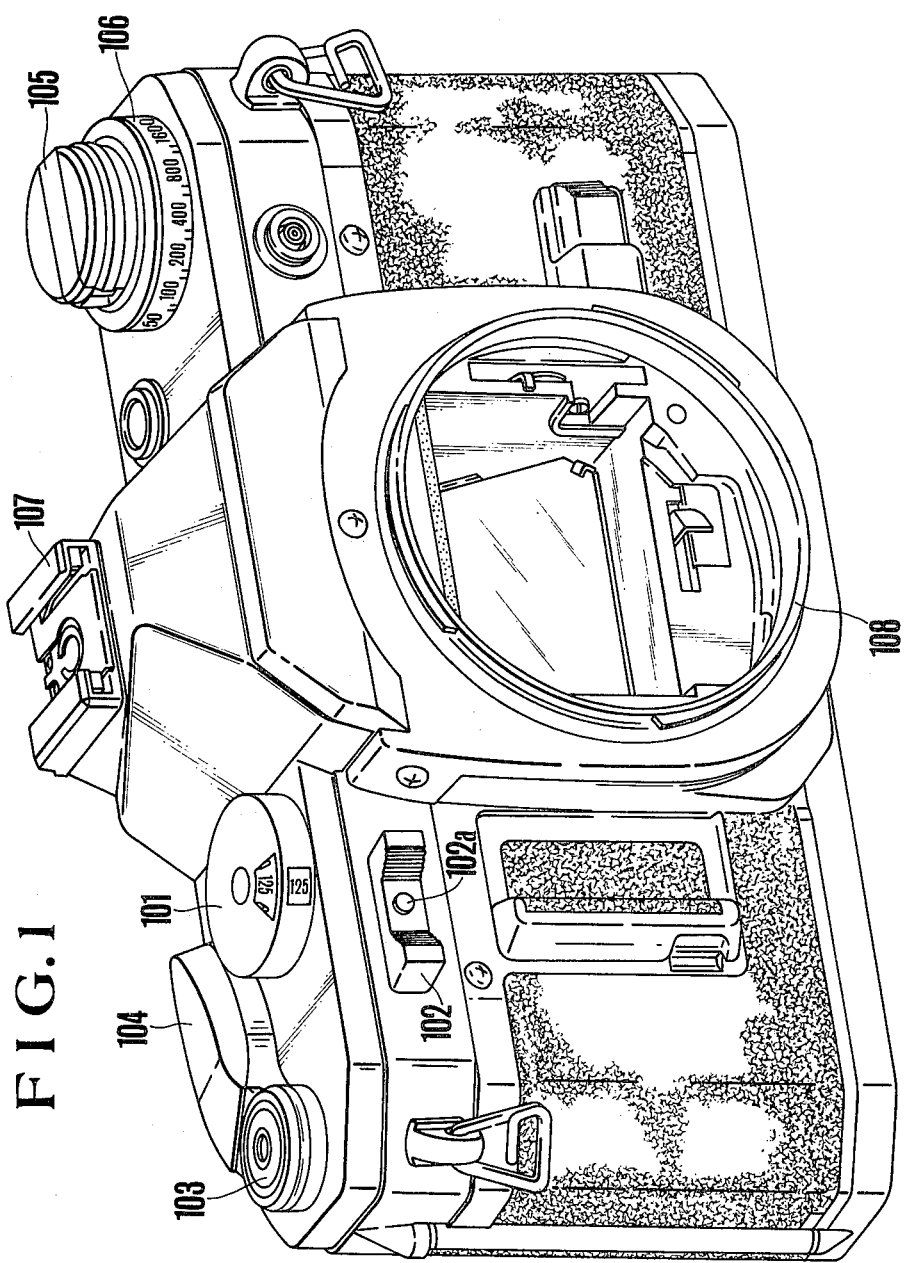
FIG. 1 is a perspective view of one embodiment of a shutter priority AE camera without an interchangeable objective lens and a motor drive unit according to the present invention.

Referring to FIGS. 1 to 6, there is shown one embodiment of the present invention applied to a shutter priority AE camera. This camera is provided with a shutter time display device 101 for displaying a set value of shutter time visible from the front and above of the camera housing, and a control knob 102 therefor. Upon depression of a lock button 102a, the control knob 102 is made movable in the horizontal direction as viewed in FIG. 1. On the top panel of the camera housing, there are further shown a shutter button 103, a winding lever 104, a collapsed rewinding crank 105 and a film speed dial 106. 107 is an accessory shoe, and 108 is a bayonet coupling for an interchangeable objective lens mount.

Figure 2:
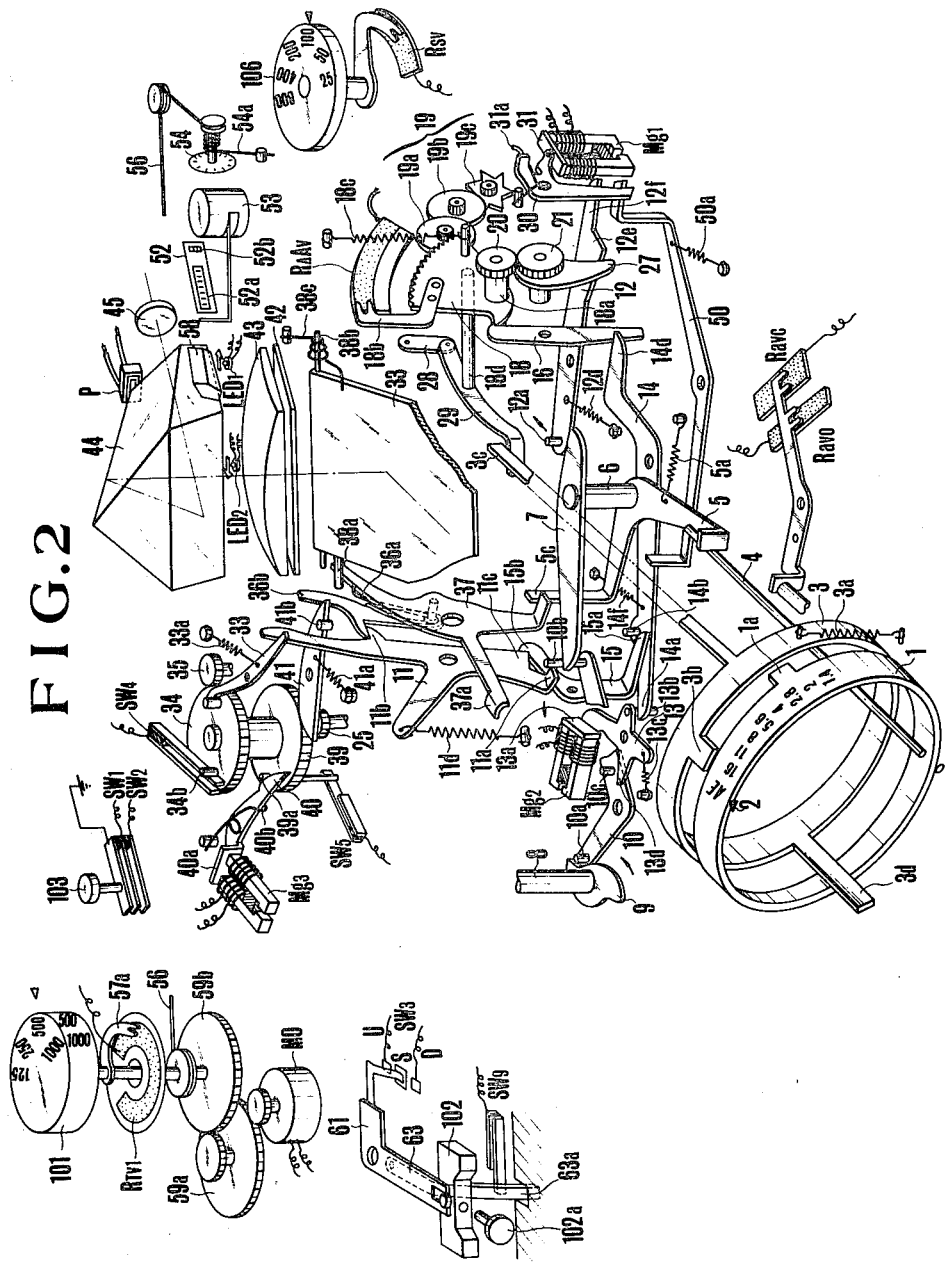
FIG. 2 is an exploded perspective view of an exposure control apparatus of the camera of FIG. 1.

In FIG. 2, an arrangement of the moving parts of the camera of FIG. 1 is shown in the shutter cocked position constituting a diaphragm control mechanism, a mirror mechanism, shutter control mechanism and release actuating and resetting mechanism each of which will be described below.

The diaphragm control mechanism includes a diaphragm ring 1 having a diaphragm value scale from 1.4 to 16 and a symbol "AE" (Automatic Exposure) positioned beyond the scale. The diaphragm ring 1 is cooperative with a stationary index 2, to control the position of a diaphragm presetting ring 3 when the manual diaphragm mode is selected, as a forwardly extending lug 3b abuts against a rearwardly extending lug 1a under the action of a spring 3a which tends to turn the presetting ring 3 in a clockwise direction. When in the automatic diaphragm mode, the position of the presetting ring 3 is controlled by a diaphragm scanning mechanism through a linkage in the form of an arm 3c rearwardly extending from ring 3, and is translated to a proper diaphragm aperture through an intermediary including a forwardly extending arm 3d and a not shown diaphragm blade control mechanism when a diaphragm closing down member or pin 4 is actuated by an automatic diaphragm drive lever 5, the latter constituting part of the release actuating mechanism.

The scanning mechanism includes a sector gear 18 rotatable at a shaft 18a and having a slider radially extending to ride on an arcuate resistance track RΔAv, a gear train 19 meshing at 19a with the sector gear 18 and terminating at a star wheel 19c, this gear train serving as a governor, and an arresting lever 30 arranged to be brought into braking engagement at its pawl with one of the teeth of the star wheel 19c under the action of a spring 31a when a solenoid Mg1 is de-energized to move an armature 31 away from the yoke of the electromagnet Mg1 as the armature 31 is fixedly secured to the arresting lever 30, provided that both of a resetting lever or escapement 12 and a control lever 50 are taken out of the path of movement of the tail of the arresting lever 30. Fixedly mounted on the common shaft 18a of the sector gear 18 is a pinion 20 meshing with a drive gear 21, the latter constituting part of the resetting mechanism. To transmit scanning motion from the sector gear 18 to the diaphragm presetting ring 3 there is an eccentrical pin 18d extending from the sector gear 18 to fixedly carry a swinging lever 29 at the center thereof, the free end of which bears the arm 3c of the presetting ring 3 and the opposite end of which is movably mounted on a free end of a lever 28.

The mirror mechanism includes a drive lever 37 having three arms; a first one 37a forwardly extends to be accessible from the outside of the camera housing; an upwardly curved one 37b bears a stud 38a extending from a mirror 38 support not shown in eccentrical relation to a pivot pin 38b, as the mirror 38 is biased by a spring 38c to assume a viewing position illustrated; and the third has a rectangularly bent-off portion normally engaged by an upwardly extending arm 5c of the aforementioned automatic diaphragm drive lever 5 under the action of a spring 5a which tends to turn the lever 5 in a counter-clockwise direction. To drive the lever 37 for movement of the mirror 38 from the viewing to the non-viewing position there is provided a spring-powered three-armed lever 11 coaxial to the lever 37 in combination with a mirror return control lever 36. The lever 36 is pivotally mounted on the lever 37 eccentrical to the axis thereof and is biased by a spring 36a to urge a pawl of the lever 36 to driving engagement with a pawl 11b. The free end of the lever 36 extends into the path of movement of a shutter closure responsive lever 41 so that when the lever 41 is turned counter-clockwise against a spring 41a from an illustrated position defined by a stopper 41b, this driving engagement is broken to permit the mirror 38 to return to the viewing position.

The shutter mechanism includes first and second master gears 34 and 39 rotatable about a common axis for controlling operation of front and rear shutter curtains not shown respectively, first and second pinions 35 and 25 meshing with the first and second gears 34 and 39 respectively and fixedly mounted on respective common shafts of not shown front and rear curtain drums. When the shutter is clocked, the front curtain master gear 34 is latched by a lever 33 in engagement at its pawl with a pin extending over the upper surface of the gear 34 under the action of a spring 33a, the tail of which extends into the path of movement of the drive lever 11. Positioned adjacent an additional pin 34b is a movable contact of a switch SW4 upon opening to initiate charging of a timing capacitor C11 (see FIG. 4). At the termination of duration of a time interval equal to the set value of shutter speed, a solenoid Mg3 is energized to cancel the magnetic force of a permanent magnet associated with the solenoid Mg3, thereby a rear curtain latching lever 40 is turned in a clockwise direction under the action of a spring 40b to disengage at its pawl from a pin 39 extending over the upper surface of the rear curtain master gear 39.

The camera release actuating mechanism includes a solenoid Mg2 with a permanent magnet upon full depression of the shutter button 103 to release a first latching lever 13. As this lever 13 is turned in a clockwise direction under the action of a spring 13c, an actuating lever 14 is driven for counter-clockwise movement against the force of a return spring 14f through a pin 13d-and-lever end 14a connection, causing a second latching lever 15 to be disengaged at its pawl 15b from the lower end 11c of the spring powered drive lever 11 and also causing a third latching lever 16 to be disengaged from the sector gear 18, as a pin 14b planted on the lever 14 and the lever end 14d strike the respective lever tails 15a and 16a. The lock lever 50 for the arresting device is also turned counter-clockwise against the force of a spring 50a, thereby the arresting lever 30 is made free to operate.

The resetting mechanism includes a cam disc 9 mounted on the bottom end of a winding shaft 8 constituting part of a not shown film transport mechanism, a cam follower pin 10a mounted on one end of a V-shaped lever 10, an intermediate lever 7 rotatable about a common axis of the automatic diaphragm drive lever 5 and extending at one end into the path of movement of a pin 10b planted on the opposite end of the V-shape or control lever 10 and at the opposite end into the path of movement of a pin 12a mounted on one end of the escapement 12, and the gear 21 having an arm 27 arranged to normally engage with the escapement 12 at 12e. To reset the spring powered drive lever 11 and the first latching lever 13, there are provided two pins 10b and 10c arranged to engage with the arms 11a and 13d respectively.

Light entering through the objective lens is reflected by the mirror 38 to a focusing screen 42 where an image of the object area to be photographed is formed as enclosed within a solid line block of rectangular area in FIG. 3. Light from the image goes through a condenser lens 43, a penta prism 44 and an eye-piece 45 to an eye of the photographer looking through the finder. Positioned behind the rear face of the penta prism 44 is a photo-sensitive element P such as a silicon photo-cell (SPC). The output of SPC is processed to drive an exposure meter 53 with a pointer 53a thereof being arranged to be visible near the field of view of the finder as shown in FIG. 3 and to scan over a diaphragm value scale 52a as the set value of shutter speed at 101 changes itself. This shutter time value is also made visible near the field of finder view at 52b. When the light value exceeds the lower and upper limits of a dynamic range of diaphragm control, two light-emitting diodes LED1 and LED2 are selectively energized to illuminate respective arrow marks 60a and 60b (FIG. 3).

The shutter speed setting device includes a reversible electric motor Mo, an intermediate gear 59a meshing with a pinion affixed to the output shaft of the motor Mo, and a driven gear 59b meshing with a pinion affixed to the intermediate gear 59a and fixedly mounted on the bottom end of a shaft, the top end of which has an annular carrier 101 with its top and side surfaces provided with respective equivalent shutter speed scales in alignment with each other so that the set value of shutter speed can be viewed through respective aligned windows from the outside of the casing of that device as shown in FIG. 1. Fixedly connected to the shaft is a slider 57a radially extending therefrom to ride on a semi-circular resistance track $R_{TV1}$. Though not shown, there is an additional variable resistor of identical construction to that of the resistor 57a and $R_{TV1}$ provided on the under surface of the circular substrate carrying the latter resistor. To display the set value of shutter speed, a cable 56 is trained between a pulley fixedly mounted on the common shaft of the carrier 101 and a pulley fixedly mounted on the common shaft of a disc 54. This disc 54 has a shutter speed scale adapted to provide an image of the set shutter speed value in the finder by means of a prism 58. The cable is pretensioned by a helical spring 54a around the shaft of the disc 54. To manually control the direction of rotation of the reversible motor Mo, there is provided a switch SW3 operating with the control knob 102 through a L-shaped lever 61. This L-shaped lever 61 has a slot formed at the end thereof and in which a pin upwardly extending from the control knob 102 is engaged upon selective control of the direction of movement of the knob 102 from a central point in the range thereof to changeover a switch SW3 for controlling the stopping and direction of rotation of the motor Mo in manually selective manner, provided that the lock button 102a is pushed to release a detent leaf spring 63 from locking engagement at its end 63a with a recessed portion of the camera housing and also to close an auxiliary power supply control switch SW9. The motor Mo control switch SW3 is constructed from a movable contact fixedly mounted on the L-shaped lever 61 and three fixed contacts of square shape designated D (Downward direction in the diaphragm value scale 52a), S(Stop) and U (Upward direction).

The apparatus of FIG. 2 further includes a pair of switches SW1 and SW2 arranged to be closed when the shutter button 103 is depressed to a first and second stroke respectively, a film speed setting variable resistor Rsv associated with the dial 106, and additional two variable resistors Ravo and Ravc for setting the full open F-number (AVO) and curvature correction factor (AVC) of the associated objective lens in automatic response to the attachment of the lens to the camera body.

Figure 4:
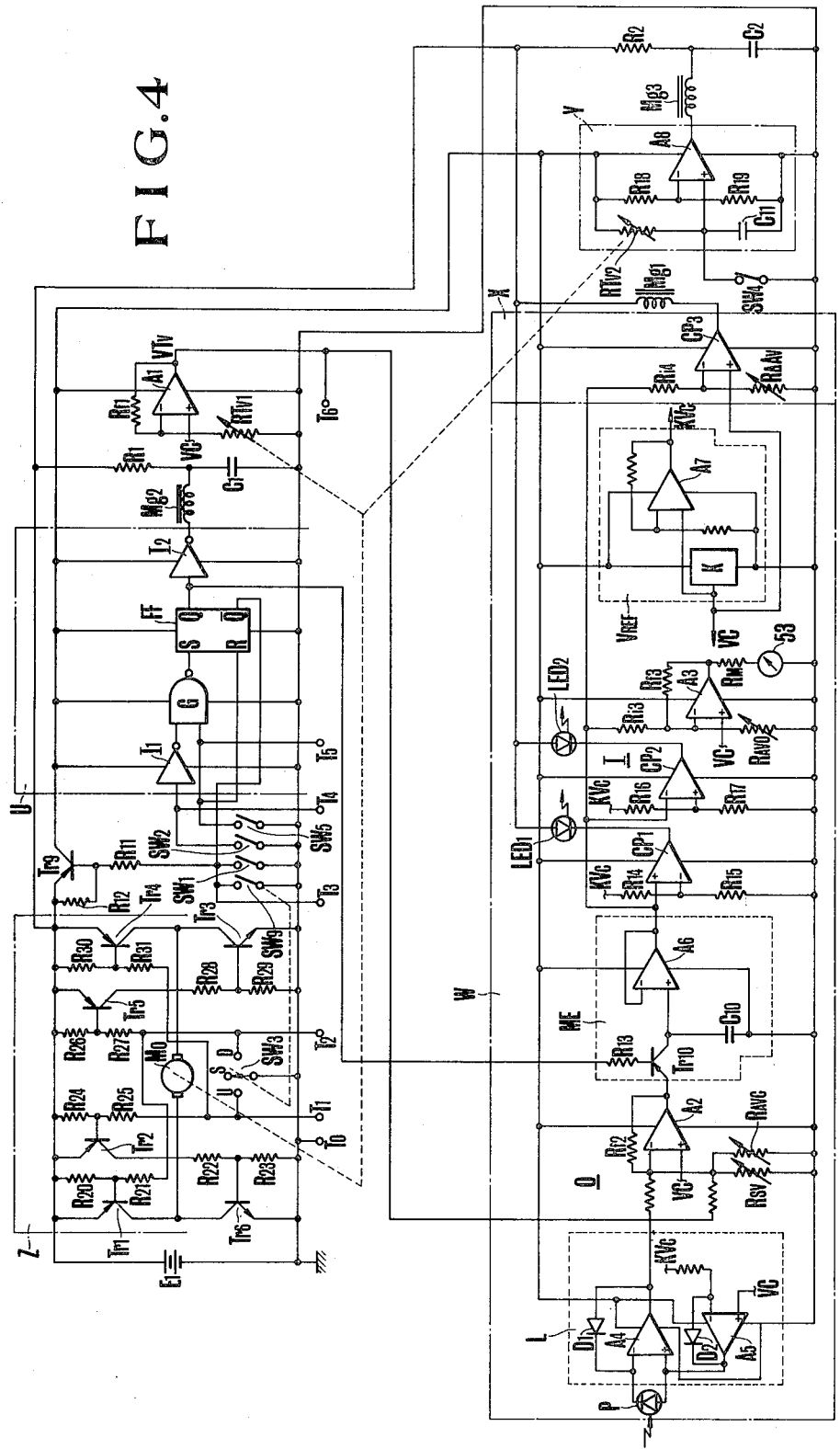
FIG. 4 is a schematic electrical circuit diagram of the exposure control apparatus of FIG. 2 with a motorized shutter speed setting device.

FIG. 4 shows the circuitry of the apparatus of FIG. 2 including an electrical power source or battery E1, a power control switching transistor Tr9 associated with the switches SW1 and SW9, a co-ordination release control circuit U, an exposure value computer circuit W, a diaphragm control circuit X, a shutter control circuit Y and a motorrized shutter speed adjusting circuit Z, these circuits being connected in parallel to the common battery E1 and the circuit Z being connected between the battery E1 and the transistor Tr9, each of which will be described in detail below.

The co-ordination control circuit U comprises the switch SW2, a first inverter I1 connected to the switch SW2, a NAND gate G with its one input connected to the output of inverter I1 and with its other input connected to the output of a switch SW5 which is arranged to be closed when the rear shutter curtain starts to run down, a flip-flop FF with its "set" input connected to the output of gate G, with its "reset" input connected to switch SW5, and with its $\overline{Q}$ output connected through a resistor R11 to the base of transistor Tr9 to thereby impart a power supply holding function to circuit U, and a second inverter I2 controlling energization and deenergization of the camera release control electromagnet Mg2. To achieve sudden supply of electrical energy to the magnet Mg2 there is provided a storage capacitor C1 which is charged through a resistor R1.

The exposure value computing circuit W comprises a sensor L, an adder O, a memory circuit ME, a display control circuit I, and a reference voltage source $V_{REF}$. The sensor L comprises the photo-sensitive element P (FIG. 2), an operational amplifier A4 with a log diode D1 connected in the feedback network of the operational amplifier A4 to produce an output signal with magnitude proportional to the logarithm of object brightness, an operational amplifier A5 having an output connected to the inverting input of operational amplifier A4, and a log diode D2 connected in the feedback network of operational amplifier A5. The adder O comprises an operational amplifier A2 with a feedback resistor Rf2 for combining the output of sensor L with a shutter speed responsive output $V_{Ts}$ from a buffer amplifier A1, and the outputs of the variable resistors $R_{Sv}$ and $R_{Avc}$. The buffer amplifier A1 has a non-inverting input connected to the output of the variable resistor $R_{TV1}$ and a feedback resistor Rf1. The memory circuit ME comprises a capacitor C10 connected at one pole to the output of adder O through a switching transistor Tr10 whose base is connected through a resistor R13 to the $\overline{Q}$ output of flip-flop FF, and an operational amplifier A6 having an inverting input connected to that pole of capacitor C10. The display control circuit I comprises an operational amplifier A3 with a feedback resistor Rf3 responsive to the output of operational amplifier A6 after compensated by the variable resistor $R_{Avo}$ to drive the meter 53, a first and second comparators CP1 and CP2 connected at their one inputs of opposite sign to the common output of operational amplifier A6 and at their other inputs to respective voltage dividers R14–R15 and R16–R17 having reference voltage levels dependent upon the lower and upper limits of the dynamic range of diaphragm control, and the light-emitting diodes LED1 and LED2 connected to the outputs of comparator CP1 and CP2 respectively. The voltage generator $V_{REF}$ comprises a constant voltage circuit K and an operational amplifier A7 connected in such a manner that a common reference voltage VC for the amplifiers A1, A2, A3 and A5 and a common battery source KVc for the amplifier A5 and the voltage dividers R14–R15 and R16–R17 are produced. The diaphragm control circuit X comprises a comparator CP3 responsive to the attainment of the resistance value of RΔAv to the reference level to produce an output controlling operation of the diaphragm arresting electromagnet Mg1. The shutter control circuit Y comprises a timing capacitor C11, the variable resistor RTv2 connected to in series to the timing capacitor C11, a voltage divider of resistors R18 and R19, and an operational amplifier A8 having two inputs connected to the respective outputs of the timing circuit and voltage divider and having an output connected to the electromagnet Mg3 controlling closing operation of the shutter. Connected across the timing capacitor C11 is the switch SW4. To achieve sudden supply of electrical energy to the electromagnet Mg3, there is provided a storage capacitor C2 and a charging resistor R2 therefor.

The control circuit Z for the motor Mo is constructed from six transistors Tr1 to Tr6 and twelve resistors R20 to R31 so that when the changeover switch SW3 is set in "U" position, the transistors Tr2 and Tr4 are turned on which is followed by conduction of the transistor Tr6, causing the motor Mo to drive the shutter speed readout device 101 for rotation in the forward direction. When in "D" position, the transistors Tr1, Tr3 and Tr5 are in the conducting state, causing the direction of rotation of the motor Mo to be reversed. T0 and T1 through T6 are connection terminals for cooperation with the motor drive unit of FIGS. 5 and 6.

The operation of the camera of FIGS. 1 to 4 is as follows: In order to select a desired combination of a particular shutter speed value with a computed diaphragm value, the photographer will depress the lock button 102, thereby the bent-off portion 63a of the leaf spring 63 is actuated to close the auxiliary power switch SW9. By this, the transistor Tr9 is turned on to start operation of the exposure control circuit. Upon alignment of the camera to an object to be photographed, the photo-sensitive element P produces an output voltage (Bvo) as a function of the object brightness (Bv) based on a formula Bvo=Bv−Avo−Avc, because the light metering mode is of TTL type. This signal Bvo is combined with signals representative of the preset value of shutter speed Tv, the speed of the used film Sv and the curvature correction factor Avc of light metering in the full open aperture from the operational amplifier A1, and the variable resistors RSv and RAvc by the operational amplifier A2 based on the Apex formula Av+Tv=Bvo+Sv, wherein Av is the proper diaphragm value. Hence, the output of the adder O represents Av−Avo=(Bv−Avo−Avc)+Sv−Tv+Avc =ΔAv, that is, how many F-stops must lose themselves from the full open F value to effect adjustment of the proper diaphragm value. This output after once stored in the memory circuit ME and then compensated for Avo by the variable resistor RAvo and operational amplifier A3 is applied to the exposure value meter 53.

In such a way, after the lock button 102a is operated, the photographer can recognize a preliminary combination of a shutter speed value and a diaphragm value. If this combination is not desirable, because the computed diaphragm value exceeds the upper limit of the diaphragm value scale, namely, F/16, for example, the photographer will move the control knob 102 to the right as viewed in FIG. 2, thereby the switch SW3 is moved to "U" position where the motor Mo is supplied with electrical energy through the transistors Tr4 and Tr6 to drive the variable resistors RTv1 and RTv2 with increasing shutter speed values. As soon as a desired shutter speed value appears in the windows of the display device 101 or near the field of view of the finder at 52b, he or she needs to remove his or her finger from the control knob 102 so that it automatically returns to the central position under the action of not shown springs, thus the desired value of shutter speed can be set. To account for the desired depth of field, the preliminary diaphragm value may be changed by a change of the preset value of shutter speed in a manner similar to the above. In connection with the light emitting diodes LED1 and LED2 it is to be noted here that when the computed diaphragm value exceeds the minimum possible size of diaphragm aperture available in the associated lens aperture mechanism, that is, the upper limit of the dynamic range of diaphragm control, the first light emitting diode LED1 is energized by the comparator CP1 to illuminate the arrow mark 60a which points leftward movement of the control knob 102 as viewed in FIG. 3, that is, from the opposite side to that shown in FIG. 2.

When the shutter button 103 is depressed to the first stroke, the power switch SW1 is closed to perform similar opertion to that which occurred when the auxiliary power switch SW9 was closed. Upon further depression of the button 103 to the second stroke, the switch SW2 is closed to connect the first inverter I1 to the circuit earth. At this time, as the switch SW5 is open, the output of the NAND gate G becomes "0" level to set the flip-flop FF with its Q output taking at "1" and its $\overline{Q}$ output at "0". Because of $\overline{Q}$=0, the base current of the power supply control transistor Tr9 is extracted to hold the transistor Tr9 in the conducting state. On the other hand, because of $\overline{Q}$=1, the memory circuit ME is latched to hold, and the output of the second inverter I2 becomes "0" to start energization of the camera release electromagnet Mg2 from the capacitor C1, which causes clockwise movement of the first latching lever 13 under the action of spring 13c. This movement is transmitted to the actuating lever 14 through the pin 13b-and-lever end 14a connection, and the actuating lever 14 strikes the second and third latching levers 15 and 16 at their tails 15a and 16a by the pin 14b and lever end 14d respectively.

As the third latching lever 16 is turned counter-clockwise, the sector gear 18 starts to rotate in the clockwise direction under the action of the spring 3a which is stronger than the reversely acting spring 18c, while the slider 18b of the variable resistor RΔAv performing scanning operation. The scanning result is compared with the output ΔAv of the memory circuit ME by the comparator CP3 upon coincidence to de-energize the electromagnet Mg1, thereby the armature 31 is moved away from the yoke by the spring 31a and the bent-off portion of the arresting lever 30 is brought into engagement with one of the teeth of the star wheel 19c. Thus the scanning result is introduced into the lens aperture mechanism through the transmission 18d, 29, 3c and so on.

As the second latching lever 15 is turned clockwise, the drive lever 11 starts to operate both of the mirror control lever 37 and the automatic diaphragm drive lever 5, thereby the mirror 38 is flipped to the non-viewing position and the diaphragm closing down member 4 is acted on to automatically form the proper diaphragm aperture value dependent upon the arrested position of the presetting ring 3, in other words, the object brightness, the preset value of shutter speed, the speed of film and so forth.

After that, the front curtain latching lever 33 is actuated by the drive lever 11. The time lag between the starts of flipping movement of the mirror 38 and of running down movement of the front shutter curtain is controlled by a not shown delay device to such a value as necessary for the diaphragm to be closed down from the full open to the minimum size. As the master gear 34 is turned, the switch SW4 is opened by the pin 34b. At the termination of duration of a time interval determined by the variable resistor RTv having a resistance value corresponding to the set value of shutter speed, the control circuit Y is actuated by the timing circuit to produce an actuating pulse which is applied to the solenoid Mg3 to cancel the magnetic force of the associated permanent magnet, thereby the lever 40 is disengaged from the pin 39 to start rotation of the rear curtain master gear 39.

When the pin 39a nears the terminal end of movement thereof, the lever 41 is struck to disengage the mirror return control lever 36 from the drive lever pawl 11b, causing the mirror 38 to be returned to the viewing position and also causing the lens aperture mechanism to be reset to the full open position as the lever 5 is driven by the spring 5a to follow up the lever 37. When the winding lever is cocked, the film is advanced through the length of one frame and the shutter mechanism is set to the charged position. At the same time, the resetting mechanism is operated by the disc cam 9 as follows. As the cam 9 is turned counter-clockwise as indicated by arrow by an angular distance of 180°, the V-shaped lever 10 is driven to turn the first latching lever 13 through the pin 10c-and-lever arm 13d connection to a position where the armature 13a is attracted by the permanent magnet Mg2, to turn the drive lever 11 through the pin 10b-and-lever arm 11a connection to the latched position by the second lever 15, to turn the escapement 12 through the intermediate lever 7 and through the lever end-and-pin 12a connection so that the scanning mechanism is acted on at the arm 27 and then latched by the third lever 16, and to turn the arresting lever 30 through the lever tail-and-lever end 12f connection.

Figure 6:
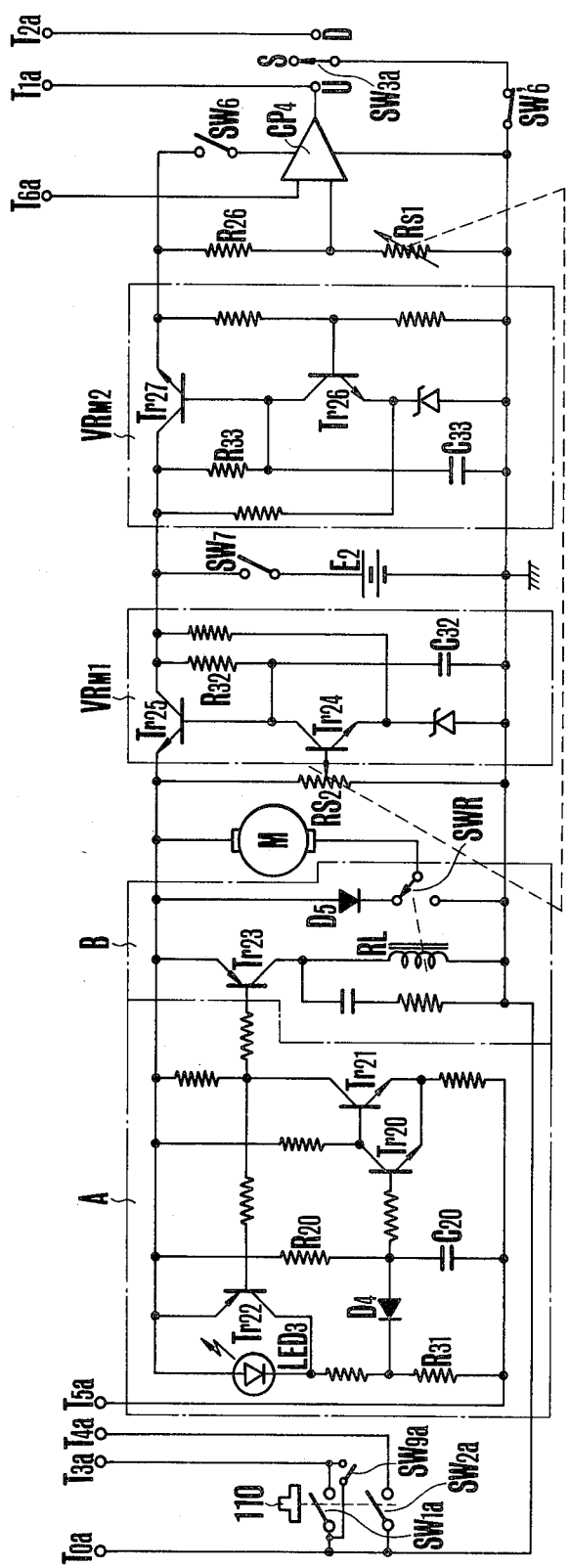
FIG. 6 is a schematic electrical circuit diagram of the motor drive unit of FIG. 5.

Referring now to FIGS. 5 and 6, there is shown an electric motor drive unit 202 attached to the camera 201 of FIGS. 1 to 4 so that automatic or manual setting of the shutter speed and camera release operation are made possible from the unit. The unit 202 has a shutter release button 110, a shutter speed setting control knob 111 and a lock button 111a all of which serve to perform similar operations to those of the parts 101, 102 and 102a provided in the camera body 201. On the rear panel of the unit housing there is shown a frame frequency dial 112 which can be set with any of its positions H (high speed), M (moderate speed) and S (slow speed) in registry with a stationary index mark 113 provided on the unit housing. To selectively control operation of the motor driven camera between an automatic mode where the frame frequency of a continuous sequence exposure is maintained constant at a level selected by the dial 112 and a manual mode where a continuous sequence exposure is performed with priority of the shutter speed selected by the knob 111, there is provided a control knob 114 shown as positioned adjacent the frame frequency dial 112. A power switch is indicated at 115. For electrical connection between the unit 202 and the camera 201 there is an arrangement of seven interconnection terminals T0a to T6a relative to that of terminals T0 to T6 provided on the bottom pannel of the camera housing.

In FIG. 6, the circuitry of the unit 202 of FIG. 5 is shown including switches SW1a and SW2a arranged to be closed when the release button 110 is depressed to the first and second strokes respectively, and connected between the terminals T0a and T3a and between the terminals T0a and T4a respectively, a shutter speed setting control switch SW3a arranged to be operated by the control knob 111, and connected at its fixed contacts U and D to the terminals T1a and T2a respectively and at its movable contact to the terminal T0a through a switch SW6', the latter being closed when the manual mode is selected by the knob 114, a switch SW6 arranged to be closed when the automatic mode is selected, a switch SW7 connected in the power supply line from a battery E2 and arranged to cooperate with the knob 115 and a switch SW9a arranged to be closed when the lock button 111a is pushed and connected across the switch SW1a.

The circuit of FIG. 6 further includes a delay circuit A, a switching circuit B, the parts A and B constituting a drive control circuit for an electric motor M having an output member connectable to the film winding shaft of the camera, a first constant voltage circuit VRM1 which serves to control the speed of rotation of the motor M, a second constant voltage circuit VRM2, an adjustable reference voltage generator of a fixed resistor R26 and a variable resistor RS1 connected in series to each other and to the output of the second constant voltage circuit VRM2, and a comparator CP4 having two inputs one of which is connected to the output of the reference voltage generator and another input which is connected through the terminal T6a to the output of the shutter speed setting device A1 of FIG. 4.

The delay circuit A includes a timing capacitor C20 connected in series with a charging resistor R20 to provide a time constant slightly longer than that necessary to complete one cycle of shutter cocking and film winding operation, a light-emitting diode LED3 arranged to be energized when that cycle is not completed within the timed interval by the circuit R20 and C20. Tr20, Tr21 and Tr22 are transistors.

The switching circuit B comprises a transistor Tr23 having a base connected to the output of the delay circuit A, a relay coil RL connected between the emitter of transistor Tr23 and the circuit earth, and a mechanical switch SWR connected in the power supply line to the motor M and arranged to be operated by the relay RL.

The first constant voltage circuit VRM1 comprises a transistor Tr25 connected in the power supply circuit from the battery E2 to the motor M and of which the conductivity is adjusted by a transistor Tr24 having a base connected to the output of a variable resistor RS2 which depends upon the selected frame frequency, and having a collector connected to the base of transistor Tr25, and also to a point on connection between a resistor R32 and a capacitor C32. The second constant voltage circuit VRM2 is constituted from two transistors Tr27 and Tr26, resistors including R33 and a capacitor C33 in a similar manner to that for the first one.

In operating the unit of FIGS. 5 and 6 when the knob 114 is set to "MANU" position and the knob 115 is thrown to "ON" position, the switch SW6 is opened, the switch SW6' is closed, and the switch SW7 is closed. Though the constant voltage circuits VRM1 and VRM2 are rendered operative, the comparator CP4 remains de-energized because of the opening of switch SW6. The output voltage of the first constant voltage circuit VRM1 is adjusted to a value dependent on the output of the variable resistor RS2 by the frame frequency dial 112. In this case, the shutter speed can be set according to a desired value as follows: When the lock button 111a is pushed inwards, the switch SW9a is closed to perform light metering operation in a manner similar to that when the aforementioned switch SW9 is closed. The corresponding diaphragm value is displayed near the field of view of the camera finder. If this diaphragm value is considered to be inconvenient with regard to the present value of shutter speed, the photographer may change the shutter speed value by operating the control knob 111 for changeover switch SW3a in a manner similar to that of the knob 102 of the camera body.

After a desired combination of a shutter speed value and a diaphragm value has been established in the circuit of FIG. 4, the photographer will depress the shutter button 110 to close the switches SW1a and SW2a in sequence, while being intended to make a continuous sequence of frame exposures each of which durates for the same time interval. At a time when a first frame exposure has been completed, the switch SW5 of the camera is closed to render the motor drive control circuit A and B operative. As the transistors Tr20 and Tr21 are turned off and on respectively, the switching circuit B because of its transistor Tr23 conducted actuates the relay RL, causing the power supply control switch SWR to be set in the power supply position for the motor M. When normal one cycle of shutter cocking and film winding operation driven by the energized motor M has been completed within the time interval corresponding to the time constant of the timing circuit C20 and R20, the switch SW5 is opened to de-energize the relay RL, causing the switch SWR to be set in the illustrated position where the counter electromotive force of the motor M is allowed to flow through a diode D5 so that the motor M is suddenly stopped from further rotation by the braking action. During this stopping operation, the charge stored on the timing capacitor C20 is discharged through a diode D4 and a resistor R31. With the shutter button 110 continuously depressed, a second frame exposure occurs in sequence with the same shutter speed value, while the diaphragm value is caused to change itself, as the level of brightness of a scene being photographed changes. After a desired number of exposures have been made in sequence, the photographer may remove his or her finger from the shutter button 110 to terminate that continuous sequence exposure.

Next, when the knob 114 is set to "AUTO" position and the power switch 115 is closed, the switch SW6 is turned on, the switch SW6' is turned off, and the switch SW7 is closed, thereby the first and second constant voltage circuits VRM1 and VRM2 are rendered operative with the motor M, and the comparator CP4 is also rendered operative. It is to be noted here that, as the switch SW6' is open, it is impossible to operate the motorized shutter speed setting device by use of the control knob 111. Then, the photographer will turn the frame frequency dial 112 to place a desired symbol, for example, H, in registry with the index mark 113 as shown in FIG. 5, thereby both of the variable resistors RS1 and RS2 are adjusted to respective values for providing a longest possible shutter time value with respect to the selected frame frequency and for controlling the speed of rotation of the motor M in accordance with the selected frame frequency.

When the release button 110 is depressed to the first stroke, the switch SW1a is closed to perform light metering and exposure value computation in a manner similar to that when the aforesaid switch SW1 of the camera is closed. On the other hand, the preset value of shutter speed is introduced from the operational amplifier A6 through the terminals T6-and-T6a connection to the comparator CP4 at the first input thereof. If this preset value of shutter speed is smaller (faster) than the longest possible shutter speed one set in the variable resistor RS1, that is, if the preset value of shutter speed is compatible with the selected frame frequency, the comparator CP4 produces no output which does not actuate the motorized shutter speed setting device through the circuit Z. When the release button 110 is further depressed to the second stroke, therefore, a first frame exposure starts to be taken in a similar manner to that when the aforesaid switch SW2 is closed. Thereafter, the running down movement of the rear shutter curtain leads to closure of the switch SW5 which causes the start of one cycle of shutter cocking and film winding operation in a similar manner to that when in the manual mode. For the once depressed release button 110, there occurs a corresponding number of frame exposures per one second in sequence.

Now assuming that the present value of shutter speed in the camera is longer (slower) than the longest possible shutter speed value determined by the selected frame frequency, for example, if the preset value of shutter speed is adapted for a smaller frame frequency, then the comparator CP4 produces an output signal representative of the difference therebetween and which is applied through the terminals T1a-and-T1 connection to drive the shutter speed setting motor Mo in the forward direction with increase in shutter speed as displayed by the device 101 of the camera. The increasing values of shutter speed are fed back from the variable resistor RTv1 through the operational amplifier A6 and through the terminals T6-and-T6a connection to the comparator CP4. This procedure continues until the adjusted value of shutter speed coincides with the longest possible shutter speed value dependent upon that particular frame frequency. In consequence, that particular continuous sequence exposure is performed with the longest possible shutter speed determined by the frame frequency dial 112.

Upon further depression of release button 110 to the second stroke, the switch SW2a is closed to perform exposure control operation in a similar manner to that when the aforementioned switch SW2 is closed. Thereafter, when the rear curtain has run down to the exposure aperture closed position, the switch SW5 is closed to drive the motor M for shutter cocking and film winding operation in a similar manner to that when in the manual mode. For the once depressed release button 110, a corresponding number of frame exposures per one second are taken in sequence.

It will be appreciated from the foregoing that an improper combination of a shutter speed value and a frame frequency as preliminarily given can be detected, and the shutter speed is automatically adjusted in accordance with the preselected frame frequency provided that the motor drive unit is switched in the automatic mode. If the photographer is intended to account for the shutter speed rather than the frame frequency, he or she may switch the motor drive unit to the manual mode in which a continuous sequence exposure can be made with the desired shutter speed value.

In the following description, another example of application of the present invention to a diaphragm priority AE camera will be explained, and the same reference characters have been employed to denote the similar or like parts to those shown in connection with the shutter priority AE camera, so that the detailed description of them is omitted. The external appearance of the diaphragm priority AE camera resembles with that of the shutter priority AE camera except for a diaphragm value display device 101' used instead of the shutter time display device 101 and the function of the control knob 102' for setting of diaphragm value instead of the control knob 102 for setting of shutter speed.

Figure 7:
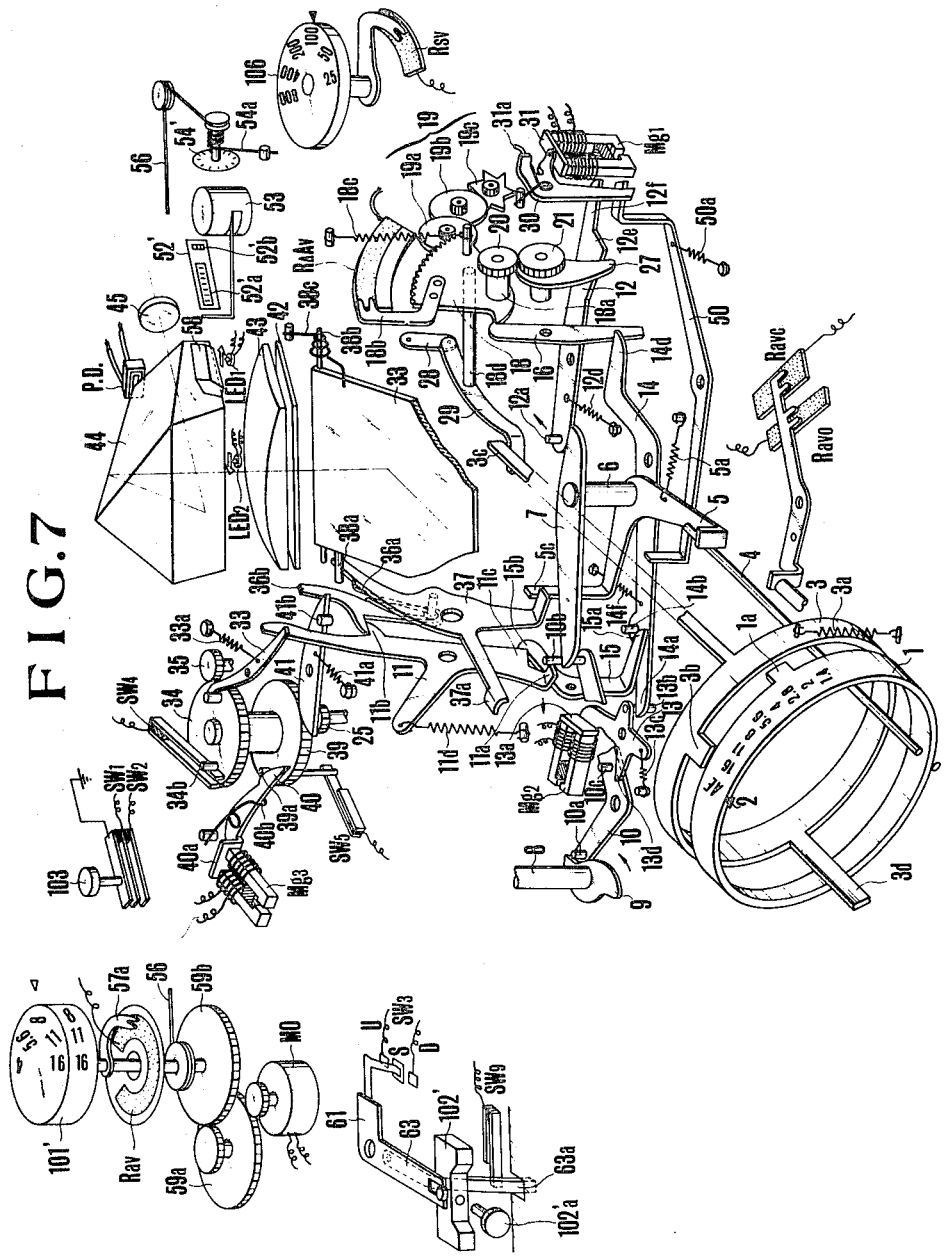
FIG. 7 is a similar view to that shown in FIG. 2 but different therefrom in that the motorized exposure factor setting device is adapted for diaphragm values.

FIG. 7 shows the internal structure of the diaphragm priority AE camera different from that of FIG. 2 in that the meter 53 is cooperative with a shutter speed scale 52a', while the circular plate 54' carries a diaphragm value scale so that the preset value of diaphragm aperture can be seen in the area of the window 52b'.

Figure 8:
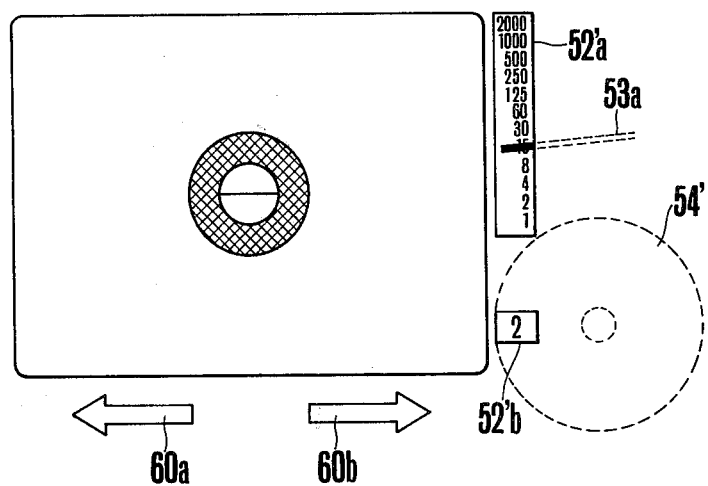
FIG. 8 is a plan view of the field of view of the finder of FIG. 7.

FIG. 8 shows an arrangement of images of the shutter speed scale 52a' and the set diaphragm value 52b' within the finder of the camera of FIG. 7. Extends over the shutter speed scale 52a' is a pointer 53a of the meter 53 so that one of the indicia which is aligned with the pointer 53a indicates the computed shutter speed value. Two arrow-like marks 60a and 60b pointed in the opposite directions to each other are out-of-range warning marks which are selectively illuminated when the computed value of shutter speed exceeds the upper and lower limits of a dynamic range of shutter control.

Figure 9:
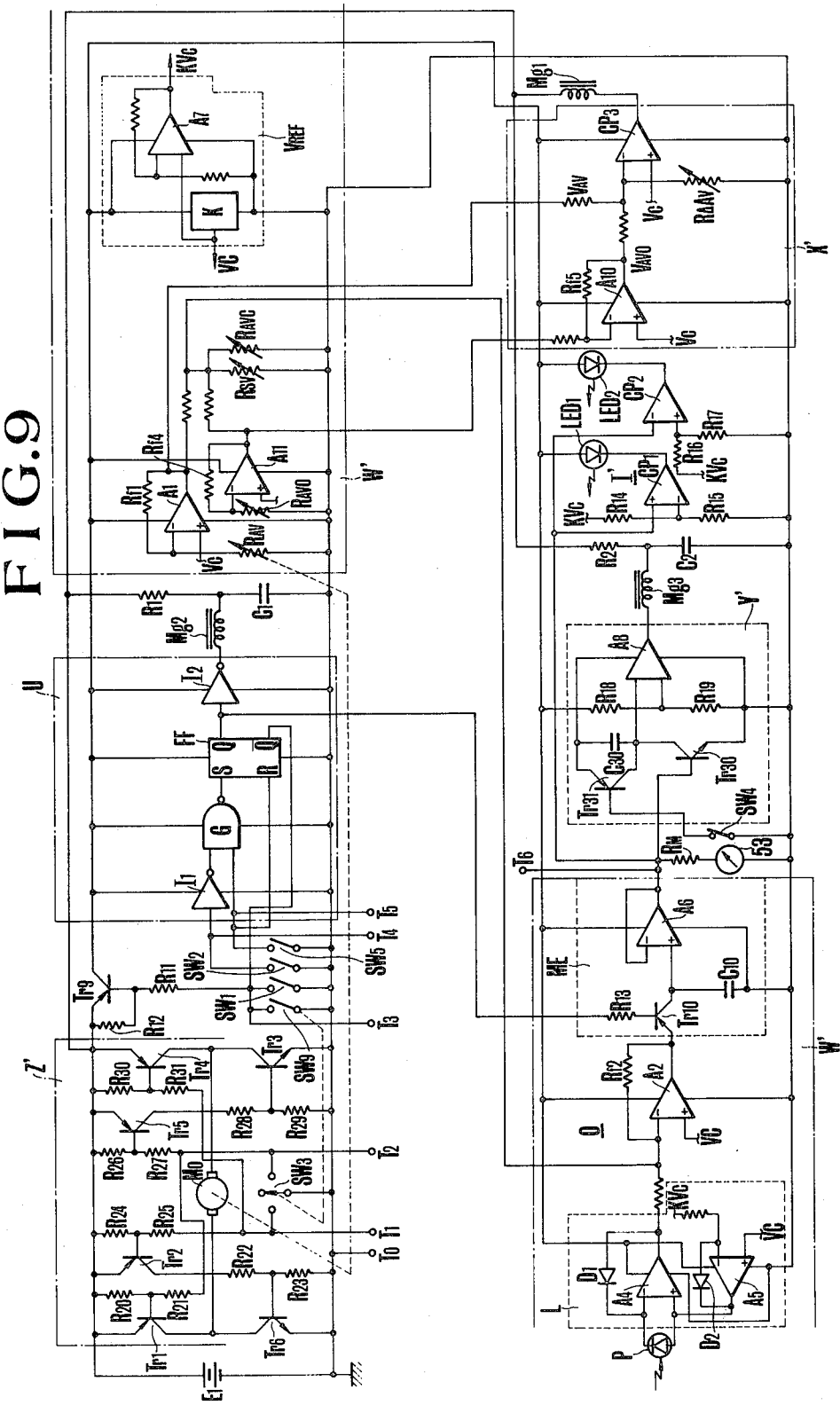
FIG. 9 is a schematic electrical circuit diagram of the exposure control apparatus of FIG. 7 with the motorized diaphragm value setting device.

FIG. 9 shows an exposure control circuit of the camera of FIG. 7 including an electrical power source or battery E1 to which are connected in parallel a diaphragm value adjusting circuit Z', the camera coordination control circuit identical to that of FIG. 4, a display control circuit I', an exposure value computing circuit W', a diaphragm control circuit X' and a shutter control circuit Y'.

The exposure value computing circuit W' comprises a sensor L, an adder O' a memory circuit ME and a reference voltage generator VREF. Of these, the parts L, ME and VREF are identical in construction and arrangement to those shown in FIG. 4. The adder O' comprises a first operational amplifier A1 with a feedback resistor Rf1 responsive to the output of a variable resistor $R_{AV}$ for producing an output representative of the preset value of diaphragm aperture, and a second operational amplifer A2 with a feedback resistor Rf2 responsive to the outputs of the sensor L, the first operational amplifier A1 and the film speed setting variable resistor $R_{SV}$ for producing an output representative of an exposure value, in this instance, a shutter speed. The output of the adder O' is applied to the memory circuit ME. The exposure meter 53 is connected through a resistor RM to the output of the memory circuit ME. Also connected to the output of the memory circuit ME is the shutter control circuit Y' which comprises a transistor Tr30 having a base connected to the output of the operational amplifier A6, a capacitor C30 connected in the collector stage of the transistor Tr30, a voltage divider of resistors R18 and R19 connected in series with each other, an operational amplifier A8 connected at one input to the output of the voltage divider R18 and R19 and at the other input to a point on connection between the capacitor C30 and transistor Tr30, and a transistor Tr31 connected across the capacitor C30 and having a base connected to the switch SW4. Connected to the output of operational amplifier A8 is an electromagnet Mg3 controlling operation of the rear shutter curtain. The diaphragm control circuit X' comprises an operational amplifier A10 with a feedback resistor Rf5 for combining the outputs of an operational amplifier A11, and the aforesaid variable resistors $R_{SV}$ and $R_{AVC}$, the amplifier A11 having a variable resistor $R_{AVO}$, and a comparator CP3 for comparing the combined output of the operational amplifiers A1 and A10 with the output of the variable resistor RΔAv upon coincidence to produce an output which is applied to the electromagnet Mg1. The diaphragm value adjusting circuit Z' is identical in construction and arrangement to the shutter speed adjusting circuit Z, though the output of the motor Mo is used to vary the diaphragm value setting resistor $R_{AV}$.

The operation of the camera of FIGS. 7, 8 and 9 is as follows: The photographer will first push the lock button 102a' to examine what value the shutter speed takes at. As the auxiliary power switch SW9 is closed by the leaf spring end 63a, the base potential of the power supply control transistor Tr9 drops so that the transistor Tr9 is turned on. In this state, the sensor L produces an output signal representative of Bvo=Bv−Avo−Avc and which is combined with the preset value of diaphragm aperture Av by the operational amplifier A2. At the same time, the speed of the used film Sv, the full open F-value curvature correction factor Avc, and the full open F value Avo are also taken into account. From the Apex relationship defined as Av+Tv=Bv+Sv, we have the proper shutter speed expressed as:

Tv=(Bv−Avo−Avc)+Sv−Av+Avo+Avc wherein Bvo=Bv−Avo−Avc because of the TTL type light metering aspect of the camera.

The output signal Tv of the operational amplifier A2 is applied to the memory circuit ME and therefrom to the meter 53, being displayed in the finder. The photographer is therefore enabled to select a desired combination of a diaphragm value and a shutter speed value. If the preset value of diaphragm aperture is judged as not suitable relative to the computed shutter speed value, the photographer need only to move the control knob 102' in either direction. When moved to the right as viewed in FIG. 7, the size of diaphragm aperture is decreased with increase in the diaphragm value displayed by the device 101' and the disc 54. When moved to the left, the diaphragm value nears to the full open F value. When the preset value of diaphragm aperture results in derivation of a shutter speed outside the dynamic range of shutter control, either of the light-emitting diodes LED1 and LED2 are lighted on, depending upon whether an under-exposure or over-exposure is to be made. These two diodes LEDs are positioned under the lower surface of the pentaprism 44 to illuminate the arrow-like marks 60a and 60b selectively, indicating the direction to which the control knob 102' must be moved.

After the lock button 102a' is released from the force exerted by the photographer's finger to push it, he or she will turn to depress the shutter button 103 to close the power switch SW1, thereby the transistor Tr9 is again rendered conducting to review the aforesaid display of the exposure parameters. Upon further depression of the shutter button 103, the switch SW2 is grounded, causing the NAND gate G to produce an output of "0" level, and the flip-flop FF to be set with the power supply control transistor Tr9 being latched in the conducting state. At the same time, the magnet Mg2 is supplied with an actuating pulse from the capacitor C1 to release the first latching lever 13 from the attraction of the associated permanent magnet. In a manner similar to that described in connection with the shutter priority camera, the camera starts to operate. As the sector gear 18 is turned, the variable resistor $R_{AV}$ produces ever-varying resistance values. When the resistance value as sensed by the comparator CP3 has reached the level corresponding to the output of the operational amplifier A3, the electromagnet Mg1 is deenergized, causing the arresting mechanism to stop scanning motion of the slider 18b. The scanning result is introduced through the pin 18c, the control lever 29 and the arm 3c to the lens aperture mechanism, thereby the presetting ring 3 assumes a position for the present value of diaphragm aperture. During this setting operation of the diaphragm, the automatic diaphragm closing down mechanism is also moved. After the mirror 38 is flipped to the uppermost position, the count start switch SW4 is opened at a time when the front curtain runs down. After a time interval depended upon the preselected diaphragm value, the object brightness, and the film speed, the shutter control circuit Y' is acted on to apply an actuating pulse to the magnet Mg3. The magnetic force of permanent magnet is cancelled by that of the solenoid Mg3 to release the rear curtain from the latching connection by the lever 40. Thereafter, the mirror mechanism and the diaphragm mechanism return to their initial positions in a manner similar to that described in connection with the shutter priority AE camera. When the winding lever is cocked to rotate the shaft 8, the winding of the film and the charging of the shutter mechanism are performed, and the scanning mechanism and the mirror drive mechanism are also reset to the initial positions.

With such diaphragm priority AE camera it is possible to perform a motor driven photography by use of the unit of FIGS. 5 and 6. In this case, the output of the comparator CP4 in the unit is brought into connection not with the terminal T1 but with the terminal T2 of the camera.

In operating the motor driven diaphragm priority AE camera, when the control knob 114 is set to "MANU" position and the knob 115 is thrown to "ON" position, the switch SW6 is opened, the switch SW6' is closed, and the switch SW7 is closed. Though the constant voltage circuits VRM1 and VRM2 are rendered operative, the comparator CP4 remains de-energized because of the opening of the switch SW6. The output voltage of the first constant voltage circuit VRM1 is adjusted to a value dependent on the output of the variable resistor RS2 by the frame frequency dial 112. In this case, the diaphragm aperture can be set according to a desired value as follows: When the lock button is pushed, the switch SW9a is closed to perform light metering operation in a manner similar to that when the aforementioned switch SW9 is closed. The corresponding shutter speed is displayed near the field of view of the camera finder. Accordingly, the photographer can select a desired combination of a preset value of diaphragm aperture and an adjusted value of shutter speed.

When the shutter button 110 is depressed, the switches SW1a and SW2a are closed in sequence to start operation of the camera in a manner similar to that when the shutter button of the camera is depressed. After a first frame exposure has been completed, the motor drive unit is actuated in a similar manner to that described in connection with the shutter priority AE camera. So long as the shutter release button 110 continues to be depressed, a second frame exposure is subsequently driven to perform. After a desired number of exposure have been taken in sequence, the photographer may remove his or her finger from the shutter release button 110 to terminate that continuous sequence exposure.

With the switch SW7 remaining unchanged from "ON" position, when the knob 114 is changed over to "AUTO" position, the switch SW6 is turned on, while the switch SW6' is turned off, so that the comparator CP4 is rendered operative, while the control knob 102' for the motorized diaphragm value setting device is rendered ineffective, in other words, the manual setting of any diaphragm value is made impossible to perform from the unit side. Then the photographer will turn to manipulate the frame frequency dial 112 in order to set a desired frame frequency, thereby both of the variable resistors RS1 and RS2 are adjusted to respective values in a manner similar to that described in connection with the shutter priority AE camera.

When the release button 110 is depressed to the first stroke, the switch SW1a is closed to perform light metering and exposure value computation in a manner similar to that when the aforesaid switch SW1 of the camera is closed. On the other hand, the computed value of shutter speed is introduced from the operational amplifier A2 through the memory circuit ME and through the terminals T6-and-T6a connection to the comparator CP4 at the first input thereof. If this computed value of shutter speed is faster than the longest possible shutter speed value determined by the so-adjusted variable resistor RS1, that is, if the computed value of shutter speed is compatible with the desired frame frequency, the output of the comparator CP4 is zero so that the motorized diaphragm value setting device remains deactuated. Upon further depression of the button 110 to the second stroke, therefore, a first frame exposure starts to operate in a manner similar to that when the aforesaid switch SW2 is closed. Thereafter the running down movement of the rear shutter curtain occurs to lead to closure of the switch SW5 which causes the start of a first cycle of shutter locking and film winding operation in a manner similar to that when in the manual mode. So long as the button 110 continues to be depressed, a continuous sequence exposure is taken at a desired frame frequency while permitting the shutter speed to vary with variation in object brightness.

Now assuming that the computed value of shutter speed exceeds the longest possible value for assurance of the desired frame frequency at a time during a particular continuous sequence exposure, then the comparator CP4 produces an output signal representative of that deviation and which is applied through the terminals T2a-and-T2 connection to actuate the diaphragm value setting motor Mo for rotation in a direction toward the full open aperture value. Increasing sizes of diaphragm aperture opening causes increasing shutter speeds which are introduced from the operational amplifier A6 through the terminals T6-and-T6a connection to the comparator CP4 at its first input. When the so-adjusted value of shutter speed has reached the longest possible value, the rotation of motor Mo is stopped. Accordingly, the remaining part of that continuous sequence exposure operates with the so-adjusted diaphragm value provided that the object brightness remains above that value.

It will be appreciated from the foregoing that if the photographer feels a difficulty of evaluating a required value of shutter speed in relation to the desired frame frequency, he or she need only to set the control knob 114 in "AUTO" position where the preset value of diaphragm aperture changes itself to automatically maintain the shutter speed above or at a level dependent upon the desired frame frequency. If the diaphragm value aperture is desired to be maintained constant, the control knob 114 has to be set in "MANU" position.

Thus, the present invention provides a motor drive unit which enables the associated camera to perform a continuous sequence exposure either at a desired constant frame frequency, that is, in the frame frequency priority mode, or with a desired constant shutter speed or diaphragm aperture without the necessity of an otherwise necessary complicated changeover mechanism.

What is claimed is:
1. A camera having a motor drive device comprising:
A. a camera body including:
 (a) light measuring means for producing an electrical signal in accordance with the brightness of the object to be photographed,
 (b) shutter time setting means for setting a shutter time value and having adjustable signal forming means for producing an electrical signal in accordance with the shutter time value to be set,
 (c) exposure calculating means responsive to the electrical signal from the light measuring means and the electrical signal from the shutter time setting means for producing an electrical signal based on the signals from the light measuring means and the setting means in accordance with the calculated value,
 (d) aperture control means for controlling the aperture in accordance with the output of the exposure calculating means,
 (e) shutter time control means for controlling the shutter time during an exposure operation in accordance with the electrical signal output of the shutter time setting means,
 (f) first drive means for causing adjustment of the signal forming means, and
 (g) first drive control means for controlling the first drive means,
B. a motor drive device including:
 (h) a second drive means for carrying out a charge operation at the aperture control means and the shutter time control means,
 (i) second drive control means for driving the second drive means, second drive control means being enabled upon completion of the exposure operation of the shutter time control means to control the shutter time and being disabled upon completion of the charge operation of the shutter time control means,
 (j) signal producing means for producing an electrical signal in accordance with the longest shutter time allowable for one picture frame at a particular picture frame speed, and
 (k) comparison means for comparing the electrical signal of the signal producing means with the electrical signal of the shutter time setting means and for operating the first drive control means in response to a difference at the comparison means.

2. A camera in accordance with claim 1, wherein the motor drive device is dismountably mounted on the camera body.

3. A camera in accordance with claim 2, wherein the second drive control means includes a timer for driving the second drive means during the time necessary for a winding operation, the timer being operated upon completion of the exposure operation of the shutter control means.

4. A camera in accordance with claim 1, wherein the first drive control means includes a first manually operated switch for operating the first drive control means.

5. A camera in accordance with claim 4, wherein the motor drive device further includes a second manually operated switch connected parallel to the first switch so as to operate the first drive control means.

6. A camera in accordance with claim 1, wherein the motor drvie device further includes switch means for controlling the operation of the comparison means, said switch means serving for enabling the comparison means with a closing operation so as to permit continuous photography with priority on the picture frame speed and for disabling the comparison means with an opening operation so as to permit continuous photography in accordance with the shutter time.

7. A camera in accordance with claim 1, wherein the signal producing means is adjustable along with the manual energizing operation of the number of the photographing picture frames.

8. A camera in accordance with claim 7, wherein the second drive control means includes voltage adjusting means for adjusting the voltage to be applied to the second drive means, the voltage adjusting means being adjusted along with the manual changing operation of the number of the picture frames.

9. A camera having a motor drive device comprising:
A. a camera body including:
 (a) light measuring means for producing an electrical signal output depending on the brightness of the object to be photographed,
 (b) aperture value setting means having a signal forming means for producing an electrical signal output in accordance with an aperture value to be set, the signal forming means being adjustable,
 (c) exposure calculating means for responding to the electrical signal output of the light measuring means and the electrical signal output of the aperture value setting means and calculating a value and for producing an electrical signal depending on the calculated value,
 (d) shutter time control means for controlling the shutter time during an exposure operation in accordance with the electrical signal of the exposure calculating means,
 (e) aperture value control means for controlling an aperture to a value in accordance with the electrical signal output of the aperture value setting means,
 (f) first drive means for adjusting the signal forming means, and
 (g) a first drive control means for controlling the first drive means,
B. a motor drive device including:
 (h) second drive means for carrying out a charge operation to energize the aperture value control means and the shutter time control means, (i) second drive control means to be enabled upon completion of the exposure operation of the shutter time control means and disabled upon completion of the charge operation of the shutter time control means for controlling the second drive means, (j) signal producing means for producing an electrical signal in accordance with the longest shutter time allowable for one picture frame at a particular picture frame speed, and (k) comparison means for comparing the electrical signal of the signal producing means with the electrical signal of the exposure calculating means and for producing a signal for operating the first drive control means when there is a difference between the signals compared by said comparison means.

10. A camera in accordance with claim 9, wherein the motor drive device is dismountably mounted on the camera body.

11. A camera in accordance with claim 10, wherein the second drive control means includes a timer for driving the second drive means during the time necessary for a winding up operation, and the timer is operated upon the completion of the exposure operation of the shutter control means.

12. A camera in accordance with claim 9, wherein the first drive control means includes a first switch for operating the means, and the first switch is manually operated.

13. A camera in accordance with claim 12, wherein the motor drive device further includes a second switch connected parallel to the first switch so as to operate the first drive control means, the second switch being manually operated.

14. A camera in accordance with claim 9, wherein the motor drive device further includes switch means for controlling the operation of the comparison means, said switch means serving for enabling the comparison means with a closing operation so as to permit continuous photography with priority on the picture frame speed and for disabling the comparison means with an opening operation so as to permit continuous photography in accordance with the shutter time.

15. A camera in accordance with claim 9, wherein the signal producing means is adjustable along with the manual changing operation of the number of the picture frame.

16. A camera in accordance with claim 15, wherein the second drive control means includes a voltage adjusting means for adjusting the voltage to be applied to the second drive means, the voltage adjusting means being adjusted along with the manual changing operation of the number of the picture frame.

17. A camera combined with a motor drive device comprising:

A. a camera body including:
(a) shutter time setting means having adjustable signal forming means for producing an electrical signal in accordance with the shutter time value to be set,
(b) shutter time control means for controlling the shutter time in accordance with the electrical signal output of the shutter time setting means,
(c) first drive means for adjusting the signal forming means, and
(d) first drive control means for controlling the first drive means, and B. a motor drive device including:
(e) second drive means for carrying out a charging operation in the shutter time control means,
(f) second drive control means for controlling the second drive means and for being enabled upon completion of the exposure operation of the shutter time control means and disabled upon completion of the charge operation of the shutter time control means,
(g) signal producing means for producing an electrical signal in accordance with the longest shutter time allowable for a picture frame at a given picture frame speed, and
(h) comparison means for comparing the electrical signal of the signal producing means with the electrical signal of the shutter time setting means and for producing a signal for operating the first drive control means when there is a difference between the signal from said signal producing means and the signal from said shutter time setting means.

* * * * *